US010112568B2

(12) United States Patent
Webber et al.

(10) Patent No.: US 10,112,568 B2
(45) Date of Patent: Oct. 30, 2018

(54) LOW MASS PASSENGER AIRBAG

(71) Applicants: James Webber, Shelby Township, MI (US); Jonathan R Vanderbossche, White Lake, MI (US); Gregory A Nestico, Canton, MI (US)

(72) Inventors: James Webber, Shelby Township, MI (US); Jonathan R Vanderbossche, White Lake, MI (US); Gregory A Nestico, Canton, MI (US)

(73) Assignee: FCA US LLC, Auburn Hills, MI (US)

( * ) Notice: Subject to any disclaimer, the term of this patent is extended or adjusted under 35 U.S.C. 154(b) by 43 days.

(21) Appl. No.: 15/254,455

(22) Filed: Sep. 1, 2016

(65) Prior Publication Data

US 2018/0056915 A1  Mar. 1, 2018

(51) Int. Cl.
| *B60R 21/16* | (2006.01) |
| *B60R 21/205* | (2011.01) |
| *B60R 21/215* | (2011.01) |
| *B60R 21/237* | (2006.01) |
| *B60R 21/2165* | (2011.01) |
| *B60R 21/217* | (2011.01) |
| *B60R 21/00* | (2006.01) |

(52) U.S. Cl.
CPC .......... *B60R 21/205* (2013.01); *B60R 21/215* (2013.01); *B60R 21/217* (2013.01); *B60R 21/2165* (2013.01); *B60R 21/237* (2013.01); *B60R 2021/0004* (2013.01); *B60R 2021/0032* (2013.01)

(58) Field of Classification Search
CPC ............ B60R 21/2155; B60R 21/2165; B60R 21/217; B60R 21/215; B60R 21/205; B60R 2021/21652; B60R 2021/2177
USPC ............. 280/728.2, 728.3, 732, 743.1, 743.2
See application file for complete search history.

(56) References Cited

U.S. PATENT DOCUMENTS

| 5,221,108 | A | * | 6/1993 | Hirabayashi ...... B60R 21/21656 280/728.3 |
| 5,509,685 | A | | 4/1996 | Boyle |
| 5,772,239 | A | * | 6/1998 | Seymour ................ B60Q 5/003 200/61.54 |
| 6,152,867 | A | | 11/2000 | Heudorfer et al. |
| 6,612,609 | B1 | * | 9/2003 | Rodriguez ............ B60R 21/201 280/729 |
| 7,396,044 | B2 | * | 7/2008 | Bauer .................... B60R 21/201 280/728.1 |
| 7,762,580 | B2 | | 7/2010 | Breed |
| 7,845,683 | B2 | * | 12/2010 | Sato ...................... B60R 21/201 280/743.2 |
| 7,874,586 | B2 | | 1/2011 | Budowick |
| 8,684,403 | B2 | | 4/2014 | Boyle |

(Continued)

*Primary Examiner* — Toan C To
(74) *Attorney, Agent, or Firm* — Ralph E. Smith

(57) ABSTRACT

An airbag system includes an airbag module configured to be supported by an instrument panel of a vehicle. The airbag module includes a fabric housing having a top panel and one or more side panels extending from the top panel, and an airbag disposed within the fabric housing, the airbag movable between an undeployed position and a deployed position. In the undeployed position, the one or more side panels include a folded portion configured to extend in an unfolding action as the airbag is inflated and deployed, the unfolding action of the one or more side panels directing an expansion of the airbag in a desired direction.

18 Claims, 3 Drawing Sheets

(56) References Cited

U.S. PATENT DOCUMENTS

| | | |
|---|---|---|
| 8,783,711 B2 | 7/2014 | Webber |
| 8,789,848 B2 * | 7/2014 | Takagi .................. B60R 21/237 |
| | | 280/728.2 |
| 9,682,678 B2 * | 6/2017 | Rose ..................... B60R 21/201 |
| 2003/0189319 A1 * | 10/2003 | Soderquist ............ B60R 21/201 |
| | | 280/728.3 |
| 2003/0234520 A1 * | 12/2003 | Hawthorn ............... B60R 21/16 |
| | | 280/728.1 |
| 2004/0130132 A1 | 7/2004 | Soncrant et al. |
| 2005/0046155 A1 | 3/2005 | Tomford et al. |
| 2007/0007752 A1 | 1/2007 | Rose et al. |
| 2007/0138779 A1 * | 6/2007 | Kwon ................... B60R 21/201 |
| | | 280/743.2 |
| 2008/0217892 A1 * | 9/2008 | Maripudi .............. B60R 21/201 |
| | | 280/740 |
| 2008/0296941 A1 | 12/2008 | Bederka et al. |
| 2009/0152842 A1 * | 6/2009 | Benny .................. B60R 21/201 |
| | | 280/728.3 |
| 2014/0028006 A1 | 1/2014 | Webber |
| 2016/0332591 A1 * | 11/2016 | Schwark ............... B60R 21/206 |

* cited by examiner

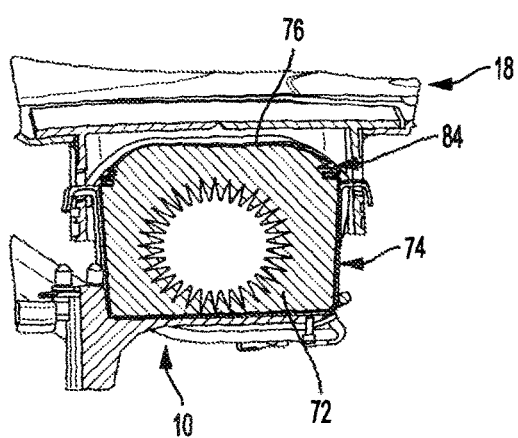
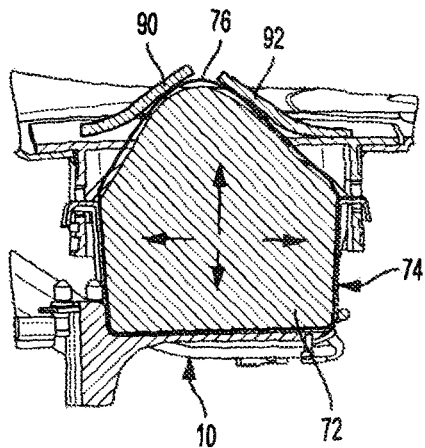
FIG. 3     FIG. 4
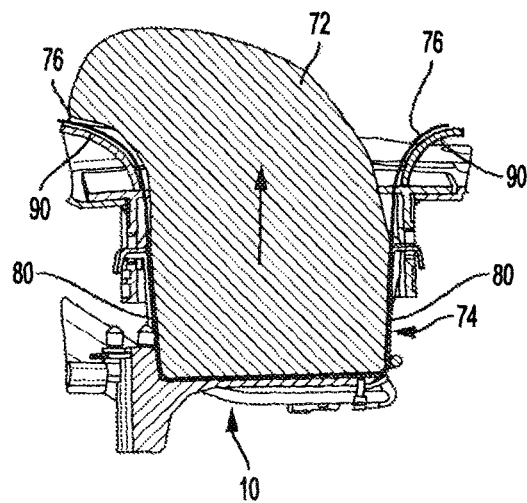
FIG. 5

LOW MASS PASSENGER AIRBAG

FIELD

The present application relates generally to vehicle airbag systems and, more particularly, to a passenger airbag system for a vehicle utilizing a low mass fabric housing.

BACKGROUND

Some inflatable airbags are configured to deploy in vehicles to protect the occupants in the event of an impact even that would tend to urge the occupant toward the vehicle dashboard or windshield. In a vehicle operating situation calling for deployment of the airbag, inflation gas is communicated from the inflator to rapidly inflate and deploy the airbag cushion. Generally, such airbags are commonly designed to be inflated in no more than a few milliseconds.

The airbag cushion of such conventional inflatable airbags is typically stored in a location that enables rapid activation and positioning such as, for example, behind the vehicle instrument panel. However, such conventional airbag systems typically require a heavy, rigid housing attached to the instrument panel to support the airbag cushion. This adds weight to the vehicle and requires a larger packaging envelope in an already crowded vehicle interior environment. Moreover, such systems may be costly due to added fastening features in the instrument panel and intricate installation requirements. Thus, while such airbags work well for their intended purpose, there remains a desire to reduce airbag system mass while providing optimal safety performance.

SUMMARY

In one exemplary aspect of the invention, an airbag system for a vehicle having an instrument panel is provided. The airbag system includes an airbag module configured to be supported by the instrument panel. The airbag module includes a fabric housing having a top panel and one or more side panels extending from the top panel, and an airbag disposed within the fabric housing, the airbag movable between an undeployed position and a deployed position. In the undeployed position, the one or more side panels include a folded portion configured to extend in an unfolding action as the airbag is inflated and deployed, the unfolding action of the one or more side panels directing an expansion of the airbag in a desired direction.

In another exemplary aspect of the invention, a vehicle is provided. The vehicle includes an instrument panel having a panel tear seam defined therein, and a passenger airbag system disposed behind the instrument panel. The passenger airbag system includes an airbag module configured to be supported by the instrument panel. The airbag module includes a fabric housing having a top panel and one or more side panels extending from the top panel, and an airbag disposed within the fabric housing, the airbag movable between an undeployed position and a deployed position. In the undeployed position, the one or more side panels include a folded portion configured to extend in an unfolding action as the airbag is inflated and deployed, the unfolding action of the one or more side panels directing an expansion of the airbag in a desired direction.

BRIEF DESCRIPTION OF THE DRAWINGS

FIG. 3 is a schematic cross-sectional view of the airbag system shown in FIG. 2 in a first position, in accordance with the principles of the present application;

FIG. 4 is a schematic cross-sectional view of the airbag system shown in FIG. 2 in a second position, in accordance with the principles of the present application; and FIG. 5 is a schematic cross-sectional view of the airbag system shown in FIG. 2 in a third position, in accordance with the principles of the present application.

Figure 1:
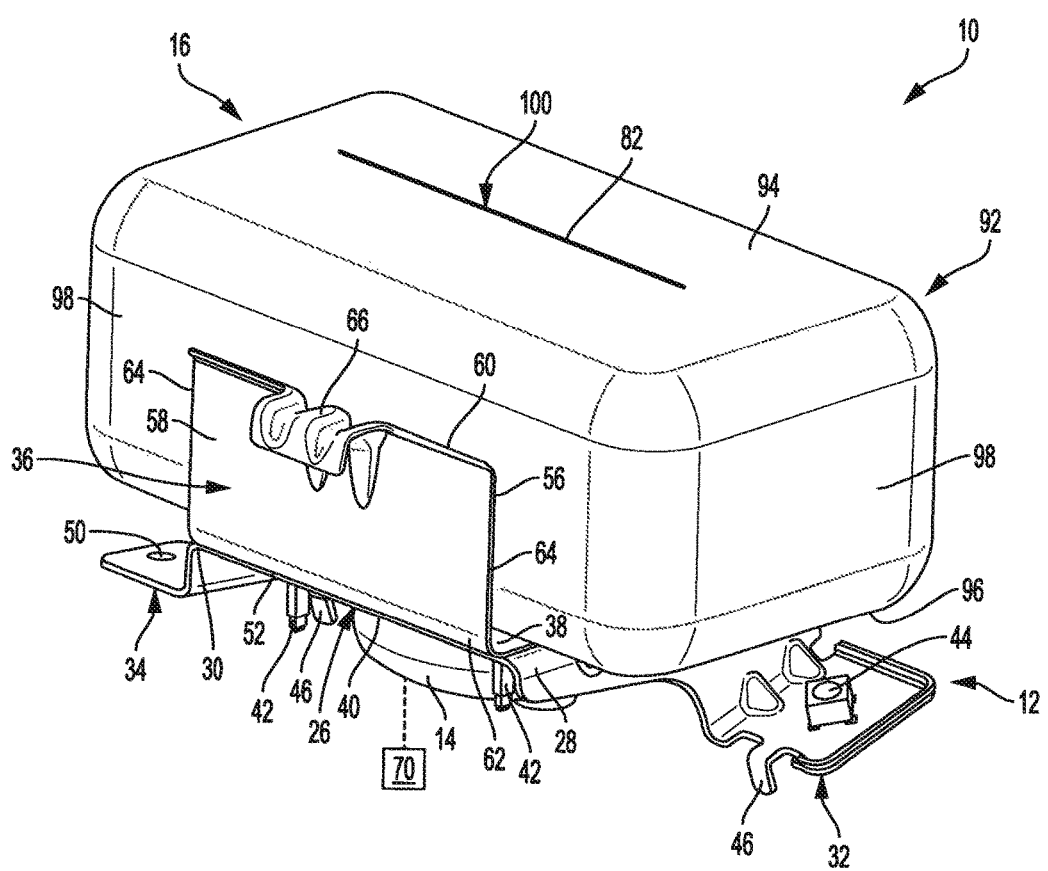
FIG. 1 is a perspective view of an example airbag system in accordance with the principles of the present application.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 2:
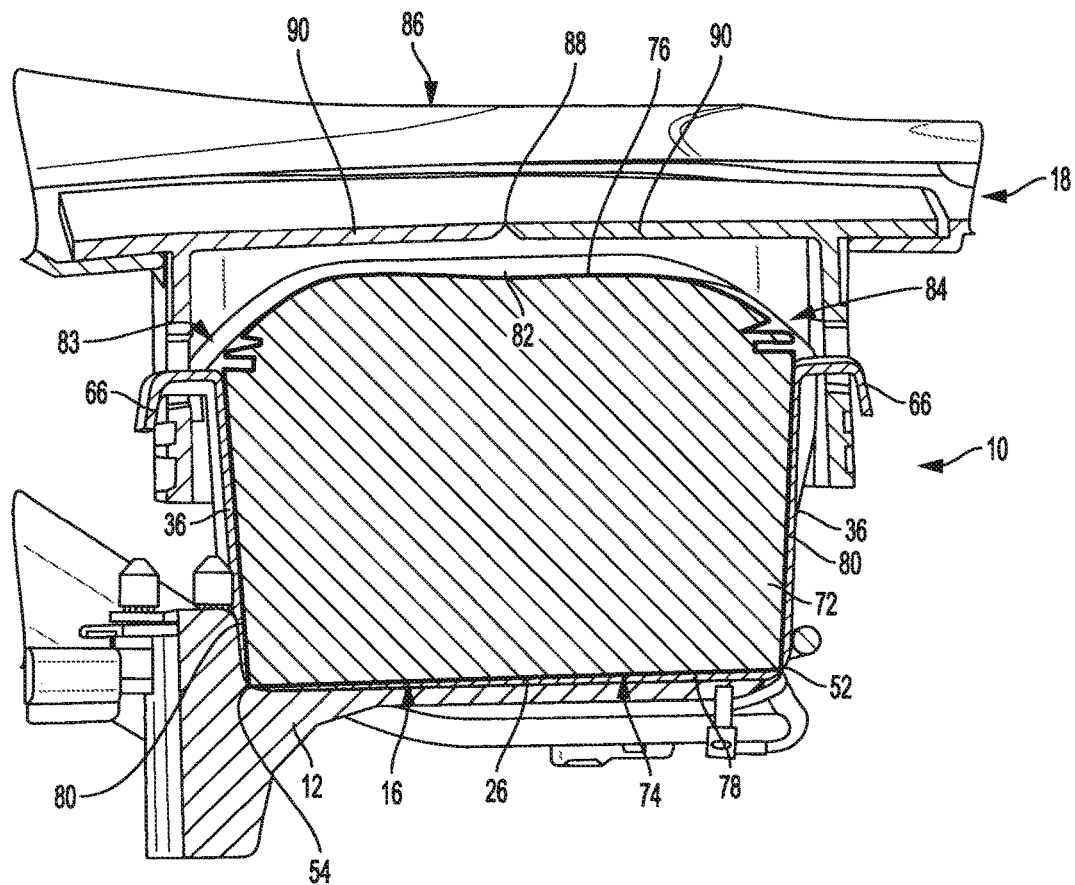
FIG. 2 is a cross-sectional view of an example vehicle including the airbag system shown in FIG. 1, in accordance with the principles of the present application.

With initial reference to FIGS. 1 and 2, an example vehicle airbag system is illustrated and generally identified at reference numeral 10. The vehicle airbag system 10 generally includes a support bracket 12, an inflator 14, and an airbag module 16. In one example, shown in FIG. 2, airbag system 10 is installed behind a vehicle instrument panel 18 and coupled to a cross-car beam (not shown) that extends generally laterally across the vehicle.

In the example embodiment, airbag system 10 is designed as a passenger airbag and integrated into the vehicle dashboard or instrument panel 18. As will be described herein in more detail, airbag system 10 includes a fabric intensifier or housing, which replaces or reduces the heavy metal or plastic housings utilized in conventional passenger airbag systems, thereby reducing system mass and improving installation and packaging. However, while not shown, it will be appreciated that low-mass airbag system 10 may be integrated into a steering wheel, a side curtain, a pillar, a door, or any other suitable location in the vehicle. Moreover, the airbag system 10 described herein is backwards compatible with many existing vehicles, thereby allowing replacement of older, heavier airbag systems.

With continued reference to FIG. 1, support bracket 12 generally includes a main body portion 26, a pair of opposed first attachment portions or panels 32 (only one shown in FIG. 1), a second attachment portion or panel 34, and a pair of partial side walls or plates 36 (only one shown in FIG. 1). While FIG. 1 illustrates one embodiment of support bracket 12, it will be appreciated that support bracket 12 may have various other configurations to accommodate various sized/shaped airbag systems and vehicle structures. For example, in alternative implementations, only portions of support bracket 12 may be used to couple airbag module 16 to instrument panel 18, while rearranging the location of inflator 14 and securing instrument panel 18 to the cross-car beam with alternative support members.

In the example embodiment, main body portion 26 is planar or generally planar and includes an upper surface 38 and an opposite lower surface 40. The airbag module 16 may be positioned on upper surface 38 and one or more fasteners (e.g., 42) may be inserted through airbag module 16 and support bracket main body portion 26 to secure airbag module 16 to support bracket 12. As shown only in FIG. 1, inflator 14 may be positioned against lower surface 40 and one or more fasteners (not shown) may be utilized to couple inflator 14 to support bracket 12. In the example embodiment, inflator 14 extends through support bracket main body portion 26 and is coupled to airbag module 16. Inflator 14 is configured to selectively inflate and deploy the airbag module 16 in the event of a collision to protect a passenger during the impact event.

In the example embodiment, one opposed first attachment panel 32 is coupled to and extends outwardly from a first edge 28 of main body portion 26. While not shown, the other opposed first attachment panel 32 is coupled to an extends outwardly from a second edge 30 of main body portion 26. Each attachment panel 32 includes various features configured to facilitate coupling support bracket 12 to structural components of the vehicle such as the cross-car beam. For example, as illustrated in FIG. 1, each first attachment panel 32 includes an aperture 44 and an alignment tab 46. Aperture 44 is configured to receive a fastener (not shown) configured to couple first attachment panel 32 to the cross-car beam, and alignment tab 46 is configured to facilitate proper positioning and alignment of support bracket 12 relative to the vehicle instrument panel 18.

In the example embodiment, second attachment panel 34 is coupled to and extends outwardly from the second edge 30 of main body portion 26. Second attachment panel 34 includes various features configured to support electrical components or connectors. For example, second attachment panel 34 includes an aperture 50 configured to receive an electrical connector (not shown).

In the example embodiment, side plates 36 are respectively coupled to and extend outwardly from edges 52, 54 of main body portion 26. Each side plate 36 is planar or generally planar and includes an inner surface 56, an outer surface 58, an upper edge 60, a lower edge 62, and side edges 64. Inner surface 56 faces toward or bounds airbag module 16 while outer surface 58 faces in the opposite direction. Lower edge 62 is coupled to support bracket main body portion 26, and upper edge 60 includes one or more attachment features 66 configured to facilitate coupling support bracket 12 to structural components of the vehicle such as the cross-car beam. For example, as illustrated in FIG. 1, attachment feature 66 is a hook configured to couple to a window formed in the instrument panel 18 to facilitate preventing the instrument panel 18 from movement (e.g., rising) during deployment of airbag module 16. In this way, support bracket 12 provides and completes a structural path between the instrument panel 18 and the cross-car beam. In alternative arrangements, support bracket 12 may only include opposed side plates 36 connected by a plate (e.g., 38) extending therebetween, without features such as 32, 34, etc.

As illustrated in FIG. 1, inflator 14 is disposed proximate support bracket 12 and is in communication with one or more sensors 70 that detect whether the vehicle is involved in an event that requires inflation of the airbag module 16. Should such an event occur, the sensors 70 communicate a signal to inflator 14 to release chemicals that begin a chemical reaction and inflate the airbag module 16 with a resulting gas. As the gas is released during the chemical reaction, the airbag module 16 is rapidly expanded causing the airbag module 16 to deploy outward and protect a passenger in the impact event. Inflator 14 may be any type of inflator device known in the art or configured to function as described herein.

With continued reference to FIGS. 1 and 2, in the example embodiment, air bag module 16 generally includes a cushion or airbag 72, a fabric intensifier or fabric housing 74 (or other flexible material), and an outer layer or wrap 92. As shown, outer wrap 90 surrounds or substantially surrounds fabric housing 74, and fabric housing 74 surrounds or substantially surrounds airbag 72.

Airbag 72 may be formed from conventional materials and methods to provide a three-dimensional cushion when inflated. For example, upon inflation, airbag 72 moves from a packed or stored position (FIG. 2) in both a longitudinal direction toward one or more vehicle occupants and laterally to provide a wider lateral dimension for engaging the occupant(s). The airbag 72 may also expand vertically as it inflates, generally between a roof and floor of a passenger compartment of the vehicle (e.g., see FIG. 5).

As shown in FIG. 2, airbag 72 is secured and stored within the fabric housing 74, which replaces and obviates the need for the heavy and rigid plastic and metal housings typically utilized to house airbag cushions. As such, the mass of airbag system 10 is reduced, thereby reducing cost, simplifying manufacturing, improving ease of installation, and improving vehicle fuel economy. The fabric housing 74 includes a top panel 76, a bottom panel 78, and one or more side panels 80. The top panel 76 includes a tear seam 82 configured to tear open and allow airbag 72 to expand out of the fabric housing once side panels 80 are in a fully extended position, as described herein in more detail.

As shown in the illustrated embodiment, an upper portion 84 of the side panels 80 proximate the top panel 76 is scrunched or folded down. In the example embodiment, only portion 84 of side panels is folded. However, the entirety or any portion of the side panels 80 between the top panel 76 and the bottom panel 78 may be folded. Without scrunching/folding of side panels 80, during an airbag deployment, a simple fabric housing would tend to expand in all directions. However, as described herein, the folded side panels 80 are configured to extend upwardly during an airbag deployment, which creates a path of least resistance and directs the airbag 72 upwardly toward the instrument panel 18 rather than in other directions (e.g., downward, sideward). In this way fabric housing 74 is configured to contain or prevent lateral expansion of airbag 72 until airbag 72 extends beyond instrument panel 18.

In addition, the support bracket main body portion 26 and side plates 36 are configured to at least partially contain the expanding airbag 72 to facilitate upward movement of the expanding airbag 72. However, the support bracket 12 is designed to minimize structure, to thereby reduce weight and eliminate the extra rigid structure associated with conventional airbag systems. As such, the folded side panels 80 unfold or expand upwardly to provide a path of least resistance toward the instrument panel 18. Otherwise, during an airbag deployment without the extendable side panels 80, the fabric housing would tend to expand in all directions.

Since it is important to direct the expanding airbag through the instrument panel 18 and toward the occupant, the folded side panels 80 unfold and create a directional force via the extra fabric, which enables directional control of the expanding airbag 72 in a desired direction. As such, airbag system 10 can focus the energy of the airbag inflation toward the tear line of the instrument panel 18 to thereby open the instrument panel 18 and allow proper positioning of the airbag 72 to protect the passenger in the impact event.

Accordingly, when fully extended or unfolded, the side panels 80 of fabric housing 74 are taller than the packaged height of the undeployed airbag 72 (e.g., as shown in FIG. 2). Moreover, as shown in FIGS. 4 and 5, the extended side panels 80 can extend upwardly beyond the outer surface of instrument panel 18 (e.g., one to two inches beyond). In this way, the folded side panels 80 enable the fabric housing 74 to direct the deploying airbag 72 upward toward the instrument panel 18 rather than in the lateral or downward directions. As such, the folded side panels 80 facilitate directing the force and thus the deployment direction of the airbag 72.

In the example embodiment, fabric housing 74 is made of, for example, high density woven airbag fabrics such as nylon or polyester. However, housing 74 may be fabricated from any suitable material that enables housing 74 to function as described herein. In some examples, side panels 80 may be folded in an accordion, zig-zagged, rolled, or crunched fashion. However, side panels 80 may be scrunched or folded in any suitable manner that enables housing 74 to function as described herein.

As shown in FIG. 1, fabric housing 74 is disposed within an outer layer or wrap 92 that facilitates handling of fabric housing 74 and maintaining folded side panels 80 in their folded position. Outer wrap 92 is fitted tightly around fabric housing 74 and includes a top panel 94, a bottom panel 96, and side panels 98. The top panel 94 includes a tear seam 100 configured to tear under the pressure of the expanding airbag 72 and fabric housing 74 to release them from the outer wrap 92. As illustrated in FIG. 1, undeployed airbag 72, fabric housing 74, and outer wrap 92 may each be rectangular-shaped and include rounded corners. However, it will be appreciated that undeployed airbag 72, fabric housing 74, and/or outer wrap 92 may each have various other shapes.

In operation, airbag 72 is packaged within fabric housing 74, which is packaged within outer wrap 92 as shown in FIGS. 1 and 2. As illustrated in FIG. 2, the airbag module 16 is disposed behind the instrument panel 18, which includes an outer show surface 86 and an instrument panel seam 88 defining instrument panel doors 90. As such, the fabric housing top panel 76 is positioned proximate the instrument panel doors 90 to minimize the distance airbag 72 must travel to extend therethrough. However, it will be appreciated that such positioning is merely exemplary and airbag system 10 may be positioned in various other orientations relative to instrument panel 18 and/or the cross-car beam. As such, relative directions such as "upward" or "downward" are merely used in regard to the example illustrations and positions.

When sensors 70 detect a deployment condition, such as an impact event, inflator 14 begins the chemical reaction to release the gas and expand the airbag 72, as shown in FIG. 3. The initial expansion force causes airbag 72 to want to expand in all directions due to the movable or flexible nature of the fabric housing 74. However, unique features of airbag system 10 enable directing deployment of the airbag 72 in a desired direction toward the instrument panel.

More specifically, during expansion, the folded side panels 80 begin to unfold and expand upward, thereby providing little or no resistance to the expanding airbag 72 in the upward direction. This enables fabric housing top panel 76 to move directly toward the instrument panel seam 88. While support bracket 12 is configured to hold instrument panel 18 down during airbag deployment by providing a structural connection between the cross-car beam and instrument panel 18, in some alternative embodiments, support bracket 12 may also provide resistance to airbag deployment in undesired directions. For example, support bracket main body portion 26 may be configured to confine or prevent some or all of downward movement of fabric housing bottom panel 78, and support bracket side plates 36 may be configured to prevent some or all of sideward movement of some of side panels 80. In this way, the expansion energy of the airbag deployment can be focused in one direction to more quickly and efficiently open the instrument panel seam 88.

Upon initial expansion of folded side panels 80, tear seam 94 in the outer wrap 92 tears under the pressure of expanding airbag 72, and fabric housing top panel 76 moves upward and applies pressure to the instrument panel doors 90. At this point, however, folded side panels 80 still have length to unfold and expand, and the increasing deployment pressure subsequently tears instrument panel seam 88 and instrument panel doors 90 swing outward allowing airbag 72 to further expand (FIG. 4). The folded side panels 80 then continue to expand to their fully extended position such that fabric housing 74 continues to direct the airbag 72 in the upward direction.

At the fully extended or unfolded position of side panels 80, the fabric housing top panel 76 is extended to a predetermined distance above instrument panel surface 86 (e.g., one to two inches). Without further folded length to expand, the pressure of the expanding airbag 72 tears the fabric housing seam 82 (see FIG. 5) at a location above the instrument panel surface 86, and airbag 72 subsequently expands toward its final position to reduce peak forces or loading on an occupant during the vehicle collision. In this way, the airbag 72 is released from the fabric housing 74 above the instrument panel surface 86, which enables airbag system 10 to be fastened to the vehicle in fewer locations than conventional airbag systems, which require fastening around the entirety of the system.

Described herein are systems and methods for reducing the mass of an airbag system. The instant airbag system replaces a conventional heavy and rigid airbag housing structure with a fabric housing, which reduces weight and complexity. The fabric housing includes sidewalls with a scrunched or folded portion configured to subsequently unfold when the airbag is deployed. The unfolding action provides a path of least resistance for the expanding airbag, thereby enabling control of the direction of expansion of the airbag. As such, the inflation energy can be focused toward the instrument panel to open the panel and deploy the airbag to its final position. At its full, unfolded extension of the sidewalls, the fabric housing tears at a location above the vehicle instrument panel and allows the airbag to deploy to the final position. Accordingly, the airbag system described herein does not require a heavy, rigid housing structure. This reduces system weight, which results in reduced cost, simplified manufacturing (less structure), improved ease of installation, and improved vehicle fuel economy.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An airbag system for a vehicle having an instrument panel, the airbag system comprising:
    an airbag module configured to be supported by the instrument panel, the airbag module including:

a fabric housing having a top panel and one or more side panels extending from the top panel; and an airbag disposed within the fabric housing, the airbag movable between an undeployed position and a deployed position, wherein in the undeployed position, the one or more side panels include a folded portion configured to extend in an unfolding action as the airbag is inflated and deployed, and wherein the unfolding action of the one or more side panels directs an expansion of the airbag in a desired direction; and a support bracket coupled to the airbag module, the support bracket configured to couple to the instrument panel and including a main body portion and a pair of opposed side plates.

2. The system of claim 1, wherein the fabric housing is a flexible housing and substantially encloses the airbag.

3. The system of claim 2, wherein the fabric housing includes a tear seam configured to tear after the folded portion has unfolded to a fully extended position.

4. The system of claim 3, wherein the tear seam is disposed in the top panel, wherein in the fully extended position, the top panel is disposed above the instrument panel of a vehicle.

5. The system of claim 2, wherein the airbag module further comprises an outer wrap having a tear seam, wherein the fabric housing is disposed within the outer wrap.

6. The system of claim 5, wherein the fabric housing substantially encloses the airbag.

7. The system of claim 1, wherein the pair of opposed side plates bound at least a portion of the one or more side panels of the fabric housing.

8. The system of claim 7, wherein the side plates each include an attachment feature configured to couple the support bracket to a structural component of the vehicle.

9. The system of claim 8, wherein the support bracket includes a generally planar main body portion having a surface configured to support the airbag module, the pair of opposed side plates extending upwardly from the main body portion.

10. The system of claim 9, wherein the support bracket further includes opposed attachment panels each extending outwardly from the main body portion, the opposed attachment panels configured to couple to the structural component of the vehicle.

11. The system of claim 10, further comprising an inflator operably associated with the airbag and configured to selectively inflate the airbag into the deployed position.

12. The system of claim 11, wherein the inflator is coupled to the support bracket.

13. The system of claim 1, wherein the fabric housing is rectangular.

14. The system of claim 1, wherein the airbag module is a passenger air bag configured to be disposed behind the instrument panel of the vehicle.

15. A vehicle comprising:
an instrument panel having a panel tear seam defined therein; and
a passenger airbag system disposed behind the instrument panel, the passenger airbag system comprising:
an airbag module configured to be supported by the instrument panel, the airbag module including:
a fabric housing having a top panel and one or more side panels extending from the top panel; and
an airbag disposed within the fabric housing, the airbag movable between an undeployed position and a deployed position,
wherein in the undeployed position, the one or more side panels include a folded portion configured to extend in an unfolding action as the airbag is inflated and deployed, wherein the unfolding action of the one or more side panels directs an expansion of the airbag in a desired direction,
wherein the fabric housing is a flexible housing and substantially encloses the airbag and includes a tear seam configured to tear after the folded portion has unfolded to a fully extended position, and
wherein the tear seam is disposed in the top panel, and in the fully extended position, the top panel is disposed above the instrument panel of the vehicle.

16. The vehicle of claim 15, wherein the passenger airbag system further comprises a support bracket coupled between the airbag module and the instrument panel.

17. The vehicle of claim 16, further comprising a cross-car structural member, wherein the support bracket is coupled to both the cross-car structural member and the instrument panel.

18. An airbag system for a vehicle having an instrument panel, the airbag system comprising:
an airbag module configured to be supported by the instrument panel, the airbag module including:
a fabric housing having a top panel and one or more side panels extending from the top panel; and
an airbag disposed within the fabric housing, the airbag movable between an undeployed position and a deployed position,
wherein in the undeployed position, the one or more side panels include a folded portion configured to extend in an unfolding action as the airbag is inflated and deployed, and wherein the unfolding action of the one or more side panels directs an expansion of the airbag in a desired direction,
wherein the fabric housing is a flexible housing substantially enclosing the airbag and includes a tear seam configured to tear after the folded portion has unfolded to a fully extended position, and
wherein the tear seam is disposed in the top panel, and wherein in the fully extended position, the top panel is disposed above the instrument panel of a vehicle.

* * * * *